United States Patent [19]

Cocks

[11] Patent Number: 4,524,887
[45] Date of Patent: Jun. 25, 1985

[54] FILTER FOR ADHESIVE APPLICATOR

[75] Inventor: Eric H. Cocks, Ft. Lauderdale, Fla.

[73] Assignee: Spraymation, Inc., Ft. Lauderdale, Fla.

[21] Appl. No.: 452,398

[22] Filed: Dec. 22, 1982

[51] Int. Cl.³ .................... B67D 5/62; B01D 23/00
[52] U.S. Cl. ........................ 222/146.5; 222/189; 210/184; 210/463
[58] Field of Search .............. 222/189, 146 HE; 210/184, 232, 463; 239/135

[56] References Cited

U.S. PATENT DOCUMENTS

| | | |
|---|---|---|
| 3,212,715 | 10/1965 | Cocks . |
| 3,224,590 | 12/1965 | Nard et al. ............... 210/433 |
| 3,240,342 | 3/1966 | Callahan, Jr. et al. ........ 210/232 |
| 3,408,008 | 10/1968 | Cocks . |
| 3,447,687 | 6/1969 | Canterbury ............... 210/232 |
| 3,485,417 | 12/1960 | Cocks . |
| 3,662,927 | 5/1972 | Cocks . |
| 3,811,405 | 5/1974 | Baker et al. ............. 222/146 HE |
| 3,826,224 | 7/1974 | Baker et al. ............. 222/146 HE |

OTHER PUBLICATIONS

Ser. No. 06,381,519—filed May 24, 1982—entitled Multiple-Outlet Adhesive Applicator Apparatus and Method.

*Primary Examiner*—Joseph J. Rolla
*Assistant Examiner*—Andrew Jones
*Attorney, Agent, or Firm*—Richard M. Saccocio

[57] ABSTRACT

A heated filter arrangement is disclosed for apparatus for spraying or dispensing at predetermined intervals a predetermined amount of hot-melt adhesive so as to maintain the viscosity of the adhesive as it passes through the filter. The arrangement provides a heated filter between the adhesive supply line and the adhesive spray apparatus. A filter housing is provided in the outlet end of the supply hose. A heating element within the hose is used to heat the housing. A screen filter is positioned within the housing such that the adhesive flowing therethrough is maintained at a predetermined temperature. The outlet of the hose is connected to adhesive apparatus. In one embodiment, the filter is attached to a plug which is threadingly fitted in a hole at the outlet end of the hose. In this manner the filter extends up within its housing within the hose and the filter may be replaced or serviced without disturbing the connection between the supply hose and the adhesive applicator gun.

10 Claims, 4 Drawing Figures

FILTER FOR ADHESIVE APPLICATOR

BACKGROUND OF THE INVENTION

1. Field of the Invention

This invention relates in general to the field of adhesive dispensing apparatus which dispenses liquid adhesives and in particular to a filtering arrangement for filtering a liquid adhesive prior to the adhesive entering an adhesive applicator.

2. Description of the Prior Art

Adhesive dispensing apparatus has in the past been used to dispense a liquid adhesive for applying a discrete quantity of the adhesive at predetermined time intervals to such products as paper cartons, baby or adult diapers, rolls of paper towels, rolls of bathroom tissue and other like products. The liquid adhesive is dispensed during the various stages of manufacturing for such purposes as securing the towels or bathroom tissue to the paper rolls, for securing the final wrap of towels or bathroom tissue to the full roll, for fastening together the multiple layers of disposable diapers, etc. Adhesive dispensing apparatus typically includes an adhesive storage or supply tank, one or more adhesive applicator heads, flow lines for connecting the adhesive supply to the adhesive applicator head, a pump for supplying the driving force to cause the flow of the adhesive, and apparatus for controlling the operation of the applicator head to achieve a desired pattern of application of the adhesive.

In the event a hot-melt adhesive is used, the apparatus further includes heating, insulation and additional control means to maintain the adhesive in a liquid state within each of the components comprising the adhesive dispensing apparatus. Hot-melt adhesives generally produce stronger bonds and cure more rapidly than comparable cold adhesives. In commercial production line applications where both high volume and high quality are necessary, hot-melt adhesives are therefore preferred. As previously noted, however, hot-melt adhesives require additional apparatus and controls to assure proper application of the adhesive to a product to achieve the desired result.

In the prior art, it is well known to heat and insulate the supply tank containing the supply of adhesive. It is similarly well known to heat and insulate the flow lines between the supply tank and the applicator head, to heat and insulate the adhesive pumping means and to heat the applicator heads.

One further device within both hot melt and cold adhesive flow systems includes filtering means. Such means serve to filter any debris within the adhesive prior to the adhesive reaching the adhesive dispensing orifice within the applicator head to prevent clogging of the same. Typically, such orifices are of the order of 0.010 inches in diameter and perhaps smaller. It can, therefore, be well appreciated that a dispensing orifice may easily be clogged causing highly undesirable production line shutdowns. Such clogging is thus to be avoided.

The use of filtering means is known in the art of adhesive dispensing systems because such filtering means are very important, if not an absolute necessity, to proper operation of the system. However, in the prior art, the filtering means is generally placed in the system at a location remote from the adhesive dispensing applicator. This is unsatisfactory because debris can be generated within, for example, the flow hose between the filtering means and the adhesive applicator. Thus, regardless of how fine a filter is used, the applicator can still be clogged by the debris generated after the filter and within the system over the considerable distance through which the adhesive must flow prior to reaching the adhesive applicator.

The supply tank typically is a major source of accumulation of particles of debris which in time are forced with the liquid adhesive toward the applicator head. However, in hot-melt systems additional particles can and often are generated by the liquid adhesive within the flow hoses. Such particles are caused by overheating of adhesive which in turn causes it to degrade or char thus developing small solid particles of debris. A filter system immediately downstream of the supply tank and pump would therefore be of no avail to trap and filter the particles which are generated within the flow hoses. A common prior art practice to overcome this problem has been the inclusion of an inline filter between the outlet of the hose and the inlet to the applicator head.

The prior art inline filters have not been completely satisfactory in operation. This unsatisfactory performance is in part caused by the filters not being heated. When an unheated filter is installed between a heated hose and a heated applicator head, a cold spot in an otherwise heated system is created. A cold spot is counter productive to maintaining uniform heating of the hot-melt adhesive. A uniform heat is a very important requirement for satisfactory operation of a hot-melt system. An unheated inline filter will, depending upon the velocity of the adhesive through the filter cool the adhesive below an optimal operating temperature resulting in an increase in viscosity. As the more viscous material continues to flow upstream and through the applicator head, it significantly changes the operating characteristics of the output of the applicator head. This occurs because the size of the flow orifice, the dispensing pattern orifice, the timing sequence and the viscosity of the adhesive all combine to apply a desired size and quantity of a dot of adhesive at a particular location on a product as the product moves past the adhesive applicator head. Consider for example the adverse effect on the manufacture of baby diapers where the change in viscosity would cause an incorrect amount of adhesive to be applied at an incorrect location. Obviously, such a result would be very detrimental. Additionally, the adverse effect of a change in viscosity would be more problematic in slower applications where small amounts of adhesive are dispensed between relatively long time intervals. In these slow applications, the adhesive moves slowly from the supply tank to the applicator head and will remain in the cold area of the inline filter for a relatively long period of time resulting in a significant increase in viscosity of the adhesive.

An ostensible solution to the above problem, that is, providing a heated blanket to an inline filter, is not a satisfactory solution. The inline filter must be removed for servicing from time to time. The advent of a heated blanket would interfere with such servicing. If the blanket were made removable, servicing could be effectuated but not without considerable inconvenience and not without the possible damage to the blanket.

Another prior art solution to the problem of an unheated filter assembly is that disclosed in my copending patent application Ser. No. 06/381,519, filed May 24, 1982 and entitled "Multiple-Outlet Adhesive Applicator Apparatus and Method". In that patent application, a removable filter element is inserted within the heated body of a multiple outlet adhesive applicator head. While such a solution is extremely satisfactory for the type of applicator head described therein, it is not applicable to the majority of single outlet or multiple outlet applicator heads presently in use today.

Accordingly, a primary object of the present invention is to provide a heated filter between the inlet of an adhesive applicator head and the outlet of the flow hose connected thereto.

Another object of the present invention is to provide a heated filter between an adhesive applicator head and the flow hose connected thereto which is integral with the flow hose.

Still another object of the present invention is to provide a heated filter between an adhesive applicator head and the adhesive flow hose connected thereto which is heated by the heating element used to heat the adhesive flow hose.

A further object of the present invention is to provide a heated filter between an adhesive applicator head and the adhesive flow hose connected thereto which is insulated to maintain a constant temperature.

A still further object of the present invention is to provide a heated filter between an adhesive applicator head and the adhesive flow hose connected thereto which is removable without disconnecting the connection between the hose and the applicator head.

SUMMARY OF THE INVENTION

The present invention comprises a heated filter assembly interposed between an adhesive applicator head and an adhesive flow hose connected thereto.

A flexible adhesive flow hose is fitted, at the applicator end, with a combination connector piece-housing to which an adhesive filter assembly is attached and to which the applicator head is attached. A filter, removably connected to the filter assembly, is fitted within the connector piece-housing such that adhesive flowing within the hose flows through the filter prior to exiting from the connector piece of the hose and into the applicator head. A temperature controlled electrical heating element is fitted to the exterior of the adhesive flow hose and the connector piece-housing. Insulation and a protective flexible sleeve surround the flow hose, the connector piece-housing and the heating element surrounding the same. An adhesive applicator head is sealingly connected to the outlet end of the connector piece-housing such that heated adhesive flows from the filtered side of the filter assembly and into the spray applicator head.

In another embodiment of the invention, the filter assembly extends through and is threadingly connected to an opening in the connector piece-housing of the adhesive flow hose. In this manner, the filter assembly may be removed for service without disconnecting the hose from the applicator head.

Various other objects, advantages and features of the invention will become apparent to those skilled in the art from the following discussion taken in conjunction with the following drawings in which:

DESCRIPTION OF THE PREFERRED EMBODIMENTS

Figure 1:
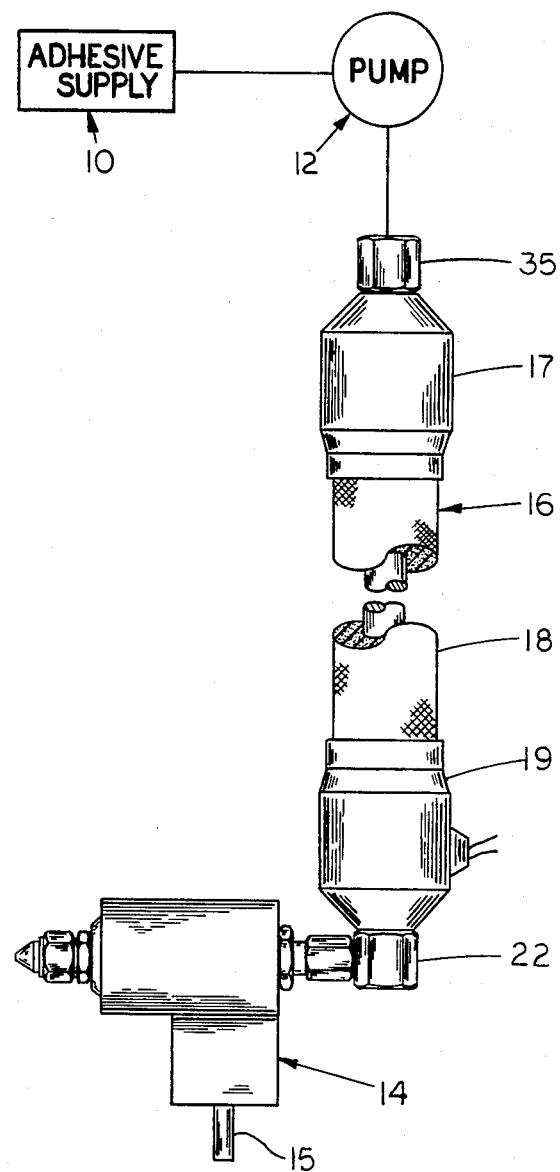
FIG. 1 schematically illustrates a typical arrangement of an adhesive dispensing system which incorporates one embodiment of the present invention.

Referring now to FIG. 1 of the drawings, there is depicted therein a typical general arrangement of hot-melt adhesive dispensing system having the present invention incorporated therein. An adhesive supply tank 10 provides for the immediate storage and supply of an adhesive for the adhesive dispensing system. In the case of hot-melt adhesive applications, the storage and supply tank 10 is heated, typically by electric means, and is insulated to prevent heat loss. Heating of the tank 10 is thermostatically controlled to maintain the adhesive in a liquid form without overheating the same. A pump or adhesive pressurizing means 12 is employed to pressurize the adhesive for purposes of causing the adhesive to flow from tank 10 and ultimately through the adhesive dispensing system. Adequate pressurization is also necessary for proper operation of the adhesive application apparatus which is commonly referred to in the trade, as an applicator head or gun 14. Details of the operation and construction of tank 10, pump 12, and applicator head 14 and a control system for applying hot-melt adhesives may be found in my U.S. Pat. No. 3,408,008, issued Oct. 29, 1968, entitled: "Apparatus for Applying Hot-Melt Adhesives". My U.S. Pat. No. 3,485,417, issued Dec. 23, 1960, entitled: "Hand-Held Applicator for Hot-Melt Adhesives" and U.S. Pat. No. 3,662,927, issued May 16, 1972, entitled: "Hot-Melt Adhesive Systems" are further illustrative of such hot-melt adhesive application apparatus and systems. My copending U.S. patent application Ser. No. 06,381,519, filed May 24, 1982, is illustrative of a multiple outlet applicator head having an integral heated filter system.

Hose assembly 16 is provided between pump 12 and applicator head 14. Hose assembly 16 allows for remote location of pump 12 and tank or adhesive supply 10 relative to applicator head 14 which typically is mounted by mounting bar 15 close to a product production line (not shown) to which the hot-melt adhesive is to be applied. Hose assembly 16 comprises inlet end 17, mid portion 18 and outlet end 19.

Figure 2:
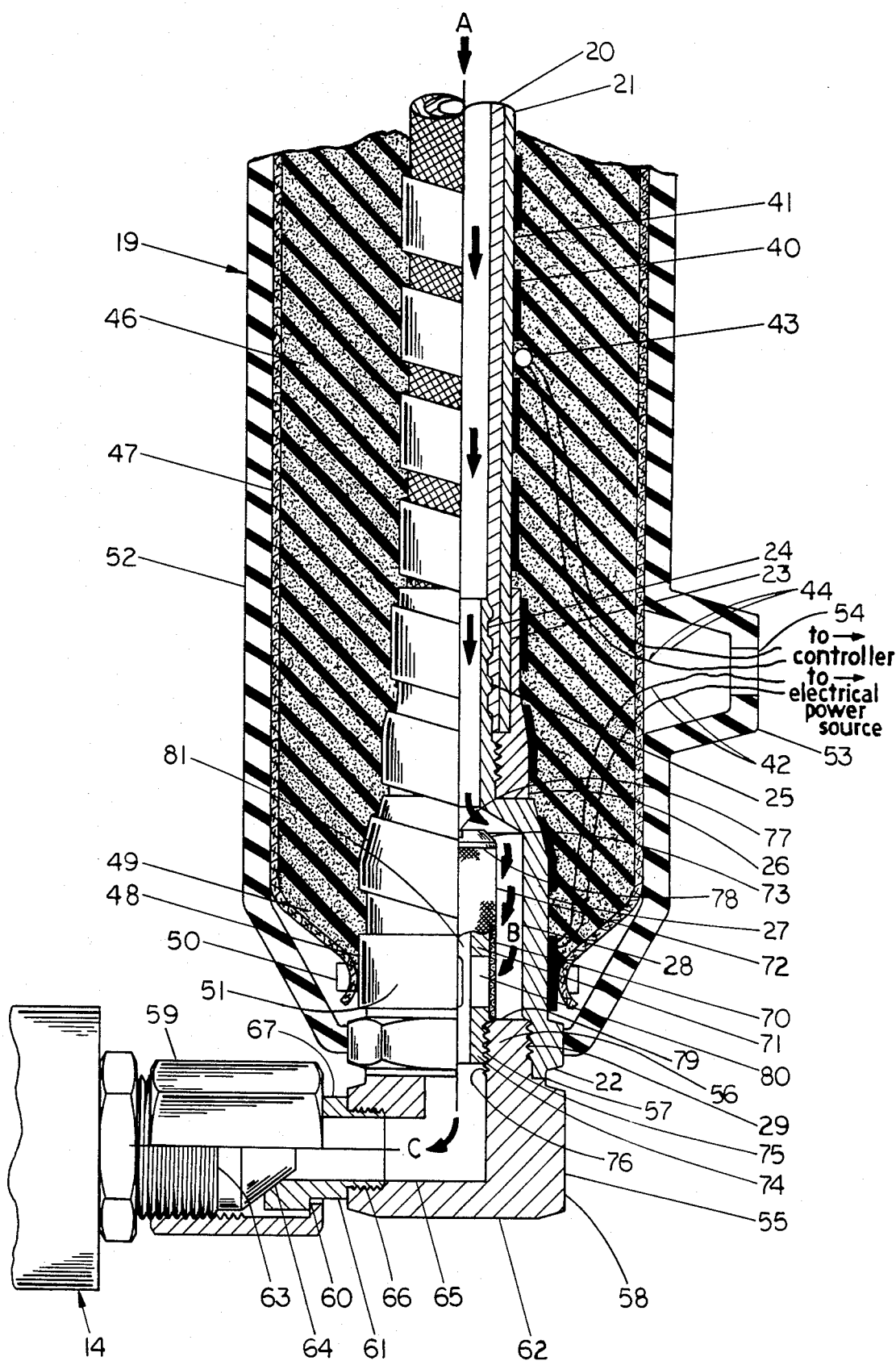
FIG. 2 depicts, in cross section, an enlarged view of one embodiment of the inventive filter arrangement illustrating a heated and insulated adhesive flow line having an integral filter assembly at one end thereof.

The outlet end 19 of hose assembly 16 is shown in detail in FIG. 2. Referring now to FIG. 2, heated and pressurized, hot-melt adhesive flows within hose assembly 16 in the direction indicated by arrow A. The conduit for the hot-melt adhesive comprises a flexible hose 20 usually made from Teflon or other similar material capable of high temperature operation of approximately 500° F. A flexible metallic mesh outer covering 21 is employed external to hose 20 to provide hose 20 with the necessary strength to prevent bursting and swelling or expanding under the pressure of the hot-melt adhesive.

A metal cylindrical connector or housing 22 is fixed to end 23 of hose 20 and outer covering 21 as shown in FIG. 2. End 24 of metal connector 22 is force-fitted within the internal diameter of hose 20 and extends therein a distance of sufficient length to assure a leakproof joint. End 24 of metal connector 22 may include a plurality of raised ridges 25 extending around the circumference of end 24 for purposes of retaining connector 22 within hose end 23 and for further assuring a leakproof joint. Sleeve 26, external to hose 20, is threadingly connected to connector 22 at the outlet end of hose 20 and outer covering 21. Sleeve 26 compresses end 23 of hose 20 and covering 21 between its internal diameter and the ridged portion 24 of connector 22 to even further assure a leakproof joint at end 23 and connector end 24 and to further retain connector 22 within hose end 23. Thus, in the manner shown and described, end 23 of hose 20 and outer covering 21 are sealingly retained within and between the outer diameter of rigid end 24 of connector 22 and the inner diameter of sleeve 26, thereby preventing leakage of the hot-melt and adhesive which is flowing within hose 20.

Connector 22 includes end 27 which is slightly larger in diameter than ridged portion 24 and extends downstream from end 23 of hose 20 and outer covering 21. Thus, there is provided an opening 28 in connector 22 the purpose of which will be more fully explained hereinafter. Internal threads 29 at the outlet end of connector 22 provide for the sealing attachment of hose assembly 16 to connector 55 which in turn is connected to applicator head 14.

Another metal connector 35 is provided for purposes of sealingly connecting end 17 of hose assembly 16 to pump 12.

A flexible strip heating element 40 is spirally wrapped around the exterior of outer covering 21 for the entire length of hose 20 and outer covering 21 as well as around connector 22. Strip heating element 40 may be retained in position around hose 20 and outer covering 21 by any conventional means suitable for such purpose such as an adhesive, adhesive tape, shrink tubing, etc. In FIG. 2, an adhesive 41 is used to fix heating element 40 to outer covering 21. Heating element 40 is an electrical heater having electrical conductors 42 attached thereto, which in turn are connected to an appropriate power source such as 120 VAC. A thermostat 43 is positioned against outer covering 21 of hose 20 for monitoring the temperature of the adhesive flowing within hose 20 and for controlling the operation of heating element 40. Lead wires 44 connected at one end to thermostat 43 and to an appropriate controller at their other end (not shown) provide for such function of thermostat 43.

An insulating flexible covering 46 is provided around and extending the length of hose 20, covering 21, connectors 22 and 35, thermostat 43 and heating element 40. Insulating covering 46 serves to uniformly maintain the temperature of the adhesive flowing within tube 20 and to eliminate inefficient heat losses. Covering 46 may comprise a closed, small cell polyurethene foam tube or other line insulating and flexible material. A further flexible covering 47 is provided around the exterior of insulating covering 46. Covering 47 may be made from a tubular form of nylon mesh or other appropriate material. Covering 47 serves to mechanically protect insulating covering 46 from wearing, tearing, shredding or being cut during installation, operation and maintenance of the hot-melt adhesive dispensing system. End 48 of covering 47 may be gathered together over end 49 of insulating covering 46 and held in place by a circular spring clip 50 at end portion 27 of connector 22 and at the final wrap 51 of heating element 40. The above description of the end portions 48 and 49 of coverings 47 and 46, respectively, and spring clip 50 applies equally to end 17 of hose assembly 16.

A final protective covering or boot 52 substantially completely covers end 19 of hose assembly 18. Boot 52 may be molded from a synthetic rubber or other like material. Its function is to provide a finished appearance to ends 17 and 19 of hose assembly 18 and to functionally protect the termination of heating element 40, insulation 46, covering 47 and snap ring 50. Boot 52 snugly encompasses outer covering 47 and end 27 of connector 22. Boot 52 includes a boss 53 which comprises a cylindrical protrusion extending radially outward from the surface thereof. An opening 54 in boot 53 allows for routing of wires 42 and 44 from within end 19 of hose assembly 18 to their respective external connections.

Male-female connector 55 provides for the fit-up of hose assembly 16 to applicator head 14 and for flow communication of the hot-melt adhesive from hose assembly 16 to the applicator head 14. In the embodiment shown in FIG. 2 the male portion 56 of male-female connector 55 is threadingly mated to internal threads 29 of connector 22. A metal to metal seal exists at junction 57 when connector 55 is fully threaded within connector 22. Flats on end 27 of connector 22 and on portion 58 of male-female connector 55 allow for the tightening of the two connectors relative to each other. A swivel nut 59 having a flange 60 thereon fitting within a groove 61 in the body 62 of connector 55 allows for connection to the male threaded portion 63 or applicator head 14. A conical joint 64 sealingly flow connects connector 55 to applicator head 14 when swivel nut 59 is fully tightened. Threads 66 and end connector 67 allow swivel nut 59 to be attached to connector 55. Flow channel 65 within connector 55 provides for adhesive flow communication between connector 22 and applicator head 14.

A filter assembly 70 is threadingly fitted to the adhesive flow inlet end or male portion 56 of male-female connector 55 and within opening 28 in connector or housing 22. Filter assembly 70 comprises a body 71 and filter 72. Body 71 comprises a hollow cylinder closed at one end 73 and open at the other end 74. Open end 74 includes external screw threads 75 which allow for a sealed connection to male portion 56 of connector 55 by means of internal threads 76. A slot 77 across the top of closed end 73 of filter body 71 is provided such that filter assembly 70 may be affixed to end 56 of connector 55 by a screw driver or other appropriate like instrument. Filter 72 may comprise a fine mesh screen made from stainless steel of other appropriate material formed into a cylinder having an internal diameter slightly larger than the external diameter of body 71. Closed end 73 of body 71 is slightly enlarged relative to the cylindrical portion thereof such that a flanged surface 78 is formed therebetween. In this manner, when filter 72 is fitted over the cylindrical portion of body 71 and the filter assembly 70 is threaded within end 56 of connector 55, filter 72 is captured between flanged surface 78 and surface 79 of connector 55. In order to effectuate such capturing, it is, of course, necessary that the length of filter 72 be longer than the distance between flange 78 and surface 79 when filter body is fully threaded within male portion 56 of connector 55. A plurality of openings 80 through the wall thickness of body 71 provides for flow communication of the adhesive from within opening 28 of connector 22 through filter 72 through openings 80 to the interior 81 of filter body 71 as indicated by the arrows B and thence into and through opening 65 in connector 55 as indicated by arrow C.

In operation, adhesive within the supply tank 10 is heated to a liquid state from whence it flows to the suction port of pump 12. Appropriate portions of pump 12 are heated to maintain the liquidity of the adhesive therein. Pump 12 significantly increases the pressure of the adhesive causing it to flow within and through hose assembly 16. Since hose assembly 16 is heated and insulated over its entire length, the adhesive flowing therethrough is continuously maintained in a liquid state. Moreover, since heating element 40 is wrapped around the outlet end connector 22 of hose assembly 16 and since the filter assembly 70 is fitted within the opening 28 provided within connector 22, forming a housing therefor, the adhesive flowing through filter assembly 70 is positively maintained in a liquid state. It is to be further noted that the substantial metal-to-metal connection between connectors 22 and 55 provide additional heating of filter assembly 70 thus filter assembly 70 is heated by conduction and radiation due to the physical location of filter assembly 70 within hose assembly 16 and due to conductive heating through connectors 22 and 55. The insulation 46 surrounding filter assembly 70 further enhances heating of filter assembly 70 and maintains a uniform temperature.

Upon exiting filter assembly 70, the adhesive flow is now filtered of any and all debris while positively being maintained in a liquid state. Because of the relatively short run of "conduit" between the outlet end of hose assembly 16 and the inlet to the applicator gun 14, the adhesive flow within this run is not given the opportunity to cool below the liquid state. In this regard, it is to be noted that it is well known to provide heating to and within a hot-melt adhesive applicator gun such as that depicted by numeral 14. Thus, there is provided an arrangement whereby a hot-melt adhesive is maintained in a liquid state particularly at the location of the adhesive flow filter and the connection between a heated flow hose and a heated applicator gun even during slow intermittent operation of the applicator gun.

Figure 3:
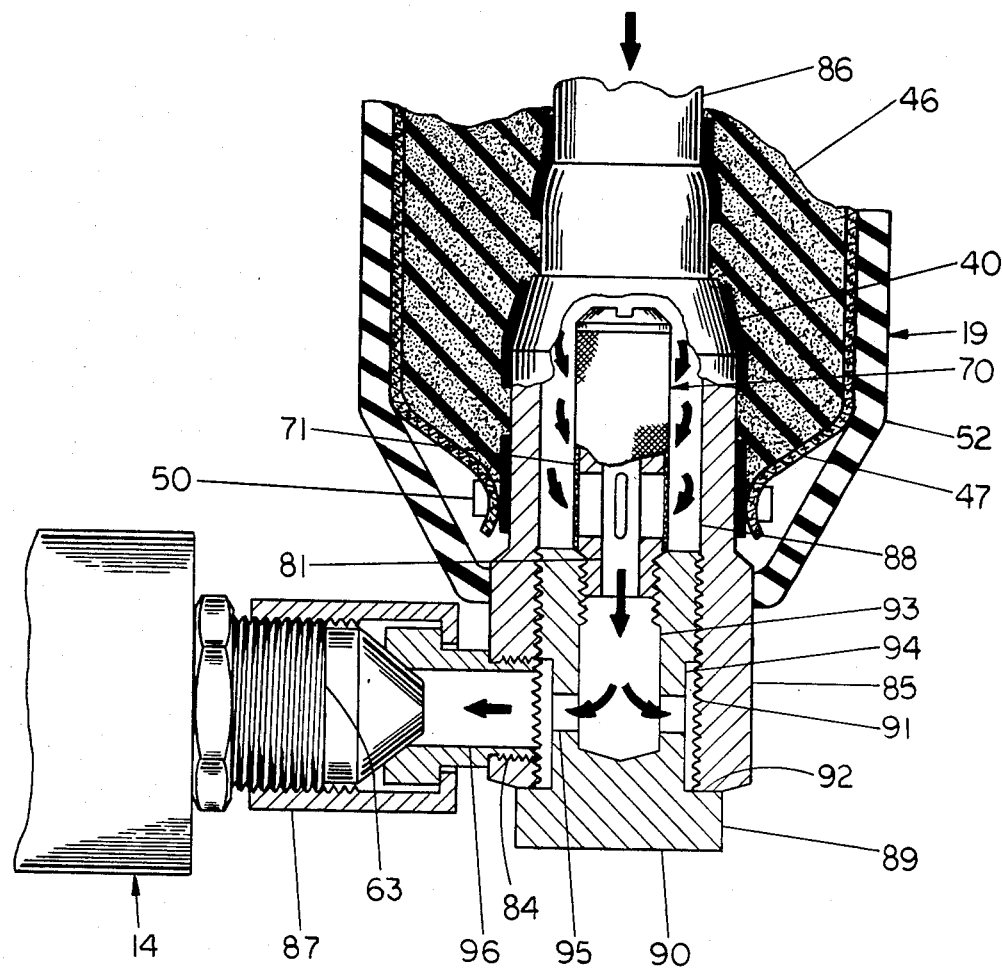
FIG. 3 illustrates a removable filter embodiment of the inventive filter arrangement at an end of an adhesive flow line; and, FIG. 4 illustrates still another removable filter embodiment of the inventive filter arrangement at an end of an adhesive flow line.

In the embodiment shown in FIG. 3, connector or housing 22 and male-female connector 55 of the embodiment of FIG. 2 are combined in connector or housing 85. In this regard, end 86 of connector 85 serves, in the same manner as end 24 of connector 22, to sealingly connect a metal fitting to the outlet end of hose 20 and outer covering 21. Similarly, swivel nut 87 of connector 85 allows for connection to the male threaded portion 63 of applicator head 14 as swivel nut 59 connects applicator head 14 to connector 55. Threads 84 allow for the fitting of nut 87 to connector 85. Also, as can be seen, filter assembly 70 again fits within an opening 88 within connector 85 again forming a housing therefor. Thus, adhesive flow around and through the filter assembly 70 of the embodiment of FIG. 3 is the same as the embodiment of FIG. 2. And, filter assembly 70 of the embodiment of FIG. 3 is fitted within the heated end 19 of hose assembly 16; consequently, it is again heated.

Still referring to FIG. 3, filter assembly 70 is threadingly connected to plug 90 which in turn is threadingly connected to connector 85. A threaded opening 91 in connector 85 is provided for this purpose. A metal-to-metal seal 92 between plug 90 and connector 85 is effectuated at their respective mating surfaces. Flats at surface 89 of the head of plug 90 provide for assembling and tightening plug 90 within connector 85. Plug 90 includes a blind opening 93 in the center thereof, a circumferential groove 94 around the periphery thereof and a plurality of holes 95 through the wall thickness between opening 93 and circumferential groove 94. In the manner, opening 96 in connector 85 and hence applicator head 14 are in adhesive flow communication with the interior flow channel 81 of filter body 71 through groove 94, holes 95 and opening 93. Adhesive flow is again indicated by flow arrows shown in FIG. 3.

It is to be noted that the arrangement of FIG. 3 allows for removal of filter assembly 70 without the need to disconnect hose assembly 16 from applicator head 14. By unscrewing plug 90 from connector 85, filter assembly 70 is also removed because of its connection to plug 90. Such capability is obviously advantageous should it be necessary to service filter assembly 70 or to replace a clogged or malfunctioning filter assembly 70 with a new assembly, or to simply check that filter assembly 70 is properly functioning.

Figure 4:
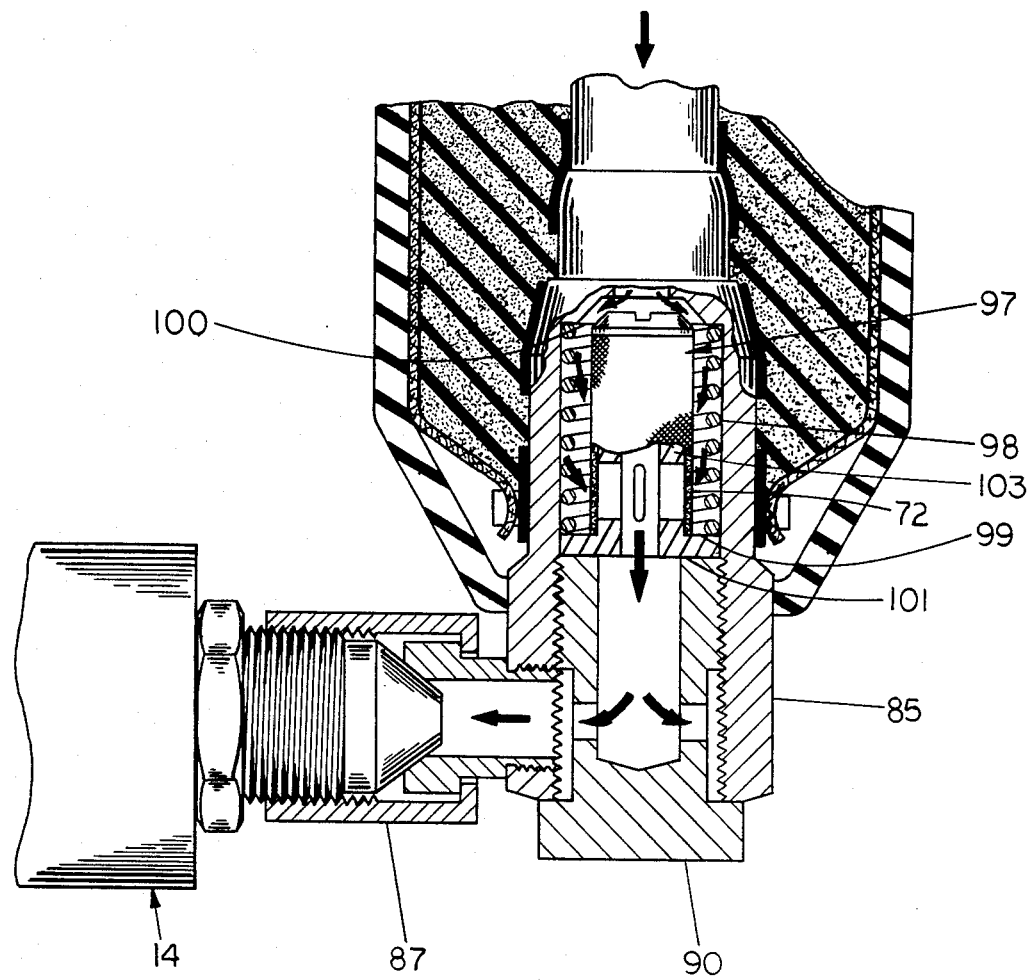

FIG. 4 illustrates a slightly modified version of the embodiment of FIG. 3. The major difference in this embodiment is the method of retaining filter assembly 97 comprising filter 72 and body 103 within opening 88 of connector 85. Spring 98 serves this function. Spring 98 is compressed between flange 99 provided at the base of filter body 103 and surface 100 located at the upstream end of opening 88. Thus, filter assembly 97 bears against surface 101 of plug 90 and is retained in this position by the force exerted by spring 98 which is compressed when plug 90 is screwed into threaded opening 91 in connector 85. The adhesive flow through the arrangement shown in FIG. 4 is exactly the same as that shown in FIG. 3.

In conclusion, in accordance with the above a heated inline filter arrangement for a pressurized hot-melt adhesive applicator system is provided immediately adjacent to the inlet of an adhesive applicator head or gun which filter arrangement eliminates any cold spot between the gun and the adhesive supply line connected thereto and which arrangement additionally provides for removal and replacement of the filter without disconnecting the supply line from the adhesive applicator.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim:

1. A filter arrangement adapted for use with an adhesive applicator and a heated adhesive supply line, said applicator being in flow communication with said supply line, comprising a housing located within the outlet end of said supply line, said housing having a flow channel therein permanently flow connected at a first end to said supply line and removably connected at a second end to said adhesive applicator, filter means within said housing for filtering the adhesive flowing through said housing, and heating means comprising an electrical heater positioned around the outer surface of said housing for heating said adhesive flowing through said filter means to maintain said adhesive in a liquid state.

2. The filter arrangement of claim 1, including a connector removably connected at one end to said filter housing and removably connected at its other end to said applicator, said connector including a flow channel therethrough having a first end in flow communication with said filter means and a second end in flow communication with the inlet of said applicator.

3. The filter arrangement of claim 2, wherein said filter means comprises a filter assembly removably connected to said first end of the flow channel in said connector, whereby the adhesive is filtered as it flows through said filter and into said first end of the flow channel in said connector.

4. The filter arrangement of claim 3, wherein said filter assembly comprises a filter and a support said support comprising a hollow cylinder closed at one end and open at its other end, said open end being threadingly connected to said first end of said flow channel of said connector, said hollow cylinder having flow openings through the wall thereof, and said filter comprises a fine mesh screen positioned around the external surface of said hollow cylinder and retained between the closed end thereof and said end of said connector connected to said filter housing.

5. The filter arrangement of claim 1, wherein said housing includes a first portion extending out from said supply line in an axial direction and a second portion extending in a direction at a right angle to said first portion and an opening through the wall of said second portion in axial alignment with said first portion and said filter means comprises a cylindrical plug having a substantially cylindrical filter assembly extending therefrom, said plug being threadingly received within said opening in said second portion of said housing.

6. The filter arrangement of claim 5, wherein said filter assembly comprises a filter and a filter support, said filter comprising a fine mesh screen in flow communication with a blind hole in said plug and said plug includes a cylindrical body portion, positioned within said opening in said housing, said body portion having a groove around the circumference thereof with one or more openings through the wall thereof flow connecting said blind hole with said circumferential groove, said circumferential groove being flow connected with the flow channel of said housing.

7. The filter arrangement of claim 6, wherein said filter assembly is threadingly connected to said plug.

8. The filter arrangement of claim 6, wherein said filter support comprises a hollow cylinder closed at one end and open at its other end, said open end being threadingly connected to said blind hole in said plug, said hollow cylinder having flow openings through the wall thereof and said fine mesh screen is positioned around the external surface of said hollow cylinder and is retained between the closed end thereof and said plug.

9. The filter arrangement of claim 6, wherein said filter support comprises a hollow cylinder having a closed first end and an open flanged second end, said hollow cylinder having flow openings through the wall thereof with said fine mesh screen being positioned around the external surface of said hollow cylinder and retained between the closed end and the flange thereof, and a spring means around said screen and positioned between said flange and a flat surface within said housing whereby said screen and said filter support are held against a flat annular surface at the inlet end of said plug.

10. The filter arrangement of claim 1, wherein said filter arrangement further comprises means for removing said filter means without disturbing said flow connection between said housing and said adhesive applicator.

* * * * *